(12) United States Patent
Anguera Miró

(10) Patent No.: US 9,305,264 B2
(45) Date of Patent: Apr. 5, 2016

(54) METHOD AND SYSTEM FOR IMPROVED PATTERN MATCHING

(71) Applicant: Xavier Anguera Miró, Barcelona (ES)

(72) Inventor: Xavier Anguera Miró, Barcelona (ES)

(73) Assignee: Telefonica, S.A., Madrid (ES)

( * ) Notice: Subject to any disclaimer, the term of this patent is extended or adjusted under 35 U.S.C. 154(b) by 226 days.

(21) Appl. No.: 14/108,656

(22) Filed: Dec. 17, 2013

(65) Prior Publication Data

US 2014/0195474 A1 Jul. 10, 2014

(30) Foreign Application Priority Data

Dec. 18, 2012 (EP) .................................... 12382508

(51) Int. Cl.
*G06F 17/00* (2006.01)
*G06N 5/02* (2006.01)
*G06N 5/04* (2006.01)
*G10L 15/12* (2006.01)

(52) U.S. Cl.
CPC ................ *G06N 5/047* (2013.01); *G10L 15/12* (2013.01)

(58) Field of Classification Search
None
See application file for complete search history.

(56) References Cited

U.S. PATENT DOCUMENTS

2010/0049072 A1* 2/2010 Syeda-Mahmood .... A61B 7/00
600/528

OTHER PUBLICATIONS

Kotsifakos et al. "A Subsequence Matching with Gaps-Range-Tolerances Framework: A Query-By-Humming Application", VLDB Endowment, vol. 4, No. 11, pp. 761-771.*
Athitsos et al. "Approximate Embedding-Based Subsequence Matching of Time Series", SIGMOD 2008, pp. 14.*
European Search Report dated Aug. 7, 2013 issued in corresponding European Application No. 12382508.
Keogh et al., "Exact Indexing of Dynamic Time Warping", Knowledge and Information Systems, vol. 7, No. 3, pp. 358-386, 2005.
Li et al., "Similarity Match in Time Series Streams Under Dynamic Time Warping Distance", IEEE Conference on Computer Science and Software Engineering, pp. 399-402, 2008.
Athitsos et al.,"Approximate Embedding-Based Subsequence Matching of Time Series", Proceedings of the 2008 ACM SIGMOD International Conference on Management of Data, pp. 365-378, 2008.
Jansen et al. "Towards Spoken Term Discovery at Scale With Zero Resources", Interspeech 2010, pp. 1676-1679, 2010.
Meinard Muller, "Information Retrieval for Music and Motion: Dynamic Time Warping", pp. 69-84, 2007.
Hiroaki Sakoe et al., "Dynamic Programming Algorithm Optimization for Spoken Word Recongnition", IEEE Transactions of Acoustics, Speech, and Signal Processing, vol. ASSP-26, No. 1, Feb. 1978.
Alex S. Park et al., "Unsupervised Pattern Discovery in Speech", IEEE Transactions on Audio, Speech, and Language Processing, vol. 16, No. 1, Jan. 2008.
Avery Li-Chun Wang, "An Industrial-Strength Audio Search Algorithm", Proceedings of the 4th International Conference on Music Information Retrieval (2003).

* cited by examiner

*Primary Examiner* — Li-Wu Chang
(74) *Attorney, Agent, or Firm* — Ostrolenk Faber LLP (57) ABSTRACT

Method, system and computer program for determining matching between two time series. They use an improved algorithm partially based in Dynamic Time Warping and Information Retrieval techniques, but solving the problems (as computational complexity, memory requirements . . . ) observed in these matching techniques.

14 Claims, 4 Drawing Sheets

METHOD AND SYSTEM FOR IMPROVED PATTERN MATCHING

CROSS-REFERENCE TO RELATED APPLICATIONS

The present application claims benefit of European Application No. 12382508.5, filed Dec. 18, 2012, the disclosure of which is incorporated herein by reference.

TECHNICAL FIELD

The present invention relates generally to pattern matching algorithms and more particularly to a method and system which use an Information retrieval-based Dynamic Time Warping algorithm to efficiently find matching subsequences between two time series or real-valued data.

DESCRIPTION OF THE PRIOR ART

In general, the aim of pattern matching algorithms is to find, given two sequences of n-dimensional data, any two sub-sequences (generally shorter) that completely or partially match each other. In addition, each of these sub-sequences can contain dissimilarities with the other sequence in terms of inserted or deleted elements (also called signal warping), which does not allow for a one-to-one comparison of the sequences using trivial mechanisms.

Pattern matching algorithms have application in many domains (bioengineering, music and speech processing . . . ). Mostly within the domain of bioengineering, there have been many algorithms proposed to find an alignment between matching sequences of symbols.

Although any real-valued sequence can be first transformed into a set of symbols, such process generally jeopardizes the accuracy of the matching, incorporating a certain amount of noise and using a less flexible matching between the series.

Many signal-based pattern matching systems use alignment algorithms. An alignment algorithm is an algorithm which finds a correspondence between the values belonging to two subsequences of values in a way that each element in one of the subsequences has one or multiple corresponding optimal matches in the other subsequences and where the pair of matching elements (matches) do not cross (i.e. the order of matching elements in both subsequences is preserved with respect to the original order in each sequence or in other words, two elements in the first subsequence align optimally with two or more elements in the second subsequence where the original order of the elements is maintained). A well known alignment algorithm is the Dynamic Time Warping algorithm.

The Dynamic Time Warping (DTW) algorithm tries to find, given two sequences or time series, the optimum path (the optimum sequence of matching points) between their start and end points via dynamic programming techniques.

Given two feature sequences $U:=(u_1; u_2; \ldots ; u_M)$ and $V:=(v_1; v_2; \ldots ; v_N)$, the standard DTW algorithm finds the optimum path through the cost matrix $S(m; n)$ with $m \in [1: M]$ and $n \in [1: N]$ for given starting $(u_1, v_1)$ and ending $(u_M, v_N)$ points. The metric used in the cost matrix varies depending on the implementation: the Euclidean distance (the path represents the minimum average cost) or the inner product similarity (the path represents the maximum average similarity) are among the two most commonly used metrics. For example, a normalized inner product distance, which gives a value of 0 when both frames are identical, could be used as given by:

$$dU, V(m, n) = 1 - \frac{\langle u_m, v_n \rangle}{\|u_m\|\|v_n\|}$$

The result of the DTW algorithm in this case is a minimum cost path $P:=(p_1; p_2; \ldots ; p_L)$ of length L, where each $p_k:=(m_k; n_k)$ indicates that frames $u_{mk}$ and $v_{nk}$ are part of the aligned path at position k. The optimal P is chosen so that it minimizes (or maximizes, depending on the metric chosen) the overall cost function D(P)=

$$\sum_{k=1}^{L} dU, V(mk, nk)$$

and satisfies the following conditions:
Boundary condition: $p_1=(1; 1)$ and $p_L=(M; N)$
Monotonicity condition: $m_{k+1} \geq m_k$ and $n_{k+1} \geq n_k$ for all $k \in [1; L]$. Additionally, local and global constraints are imposed that define the values that $(m_k; n_k)$ are allowed to take with respect to their neighbors In other words, DTW finds the optimal non-lineal alignment between two time series (see for example, in Hiroaki Sakoe and Seibi Chiba, "Dynamic Programming Algorith Optimization for Spoken Word Recoginition"). In the present document, we consider a time series as a sequence of real valued n-dimensional points which maintain a certain order among them (a time order or any other type of order), where n can be from 1 to any computationally feasible dimensionality. The comparison of any two points is done through a defined metric of distance or similarity, returning a value $\in R$.

DTW algorithms have been used in the past for many applications when dealing with real-life problems, as they allow us to compute the similarity between two sequences of measured events that might be similar but not necessary exact (neither in time nor in amplitude). A similar set of algorithms have become very useful in finding repeating subsequences within DNA sequences, although in this case the amplitude variation is heavily quantified by first obtaining a symbolic representation of the data.

One area where DTW has been applied to extensively is to match speech patterns. In speech, audio is usually encoded using between 30 and 100-dimensional vectors that encode the way the spectral information is structured within a small window of speech. Usually around 100 to 200 such vectors are extracted per second in fixed intervals. Then, for any two sequences of speech, DTW finds the optimal alignment between them while considering that some parts of the pattern (i.e. some phonemes in the spoken words) might be spoken faster in one sequence than in the other, or otherwise. Only if the two speech patterns correspond to the same word or sentence, the alignment will return a high similarity score.

The main drawback for standard DTW algorithms (either in the basic implementation or in speedup versions recently proposed) is that it is able only to perform an alignment between the start and end points in both time series. The speedup algorithms can achieve important speed improvements when compared to standard dynamic programming implementations of DTW by imposing some upper-bounds and global constraints that allow the search to discard patterns without fully processing them, but are still always constrained to a known start-end point. In order to make the search more flexible when searching for smaller patterns within longer time sequences (i.e. when the start and end in the long sequence is considered unknown), two variations of the standard DTW algorithm (Segmental-DTW, as described for example by Alex Park and James Glass in "Unsupervised pattern discovery in speech", and subsequence-DTW, as described for example by Meinard Muller in "Information retrieval for music and motion") allow us to find the optimum start-end points, together with the best alignment, provided that the pattern being searched for still imposes predefined start-end points. In the case of the subsequence-DTW algorithm this is done by considering all points in the longer time series as possible start points from which a dynamic programming approach, like in DTW, is conducted. At the end of the process, the optimum end point is selected and by backtracking the optimum path we find the optimum path and start point.

In addition, there are some applications where we might be interested in finding matches contained within both time series, but which do not start or end in known locations of the time series. This would be the case when looking for repetitions of words in a talk (without going into a written form) or when the pattern search setting proposed above needs to match time subsequences that not only contain the audio snippet to be searched for, but also some unknown amounts of filler content before and after. Recently there have been some alternatives that allow us to search for subsequences within two time series using algorithms that are inspired in the standard DTW.

As it will be shown later, the present invention is partially inspired in the DTW algorithms, but avoiding the drawbacks of this type of algorithms because, as it will be described later, the DTW algorithms are very computationally inefficient and require a high amount of memory to perform the alignment (thus not being useful for very large sequences).

The present invention is also partially inspired in the time-matching algorithms used in information retrieval for search. Within the domain of Information retrieval, algorithms can be found that are able to search for matching patterns within two time series in an effective manner by finding diagonal alignments between the most similar points in both series (see for example Avery Li-chun Wang, "An Industrial Strength Audio Search Algorith" in Proc. ISMIR, Baltimore, USA, 2003). These techniques require much less memory than DTW to process (as they work at the vector level, not with matrices of similarities between points) but can not find matching patterns that are related through non-linear alignments (i.e. warping) between the series.

The algorithm proposed in the present invention allows us to search for subsequences in time series that match with a certain allowed time warping.

The main drawbacks encountered in the prior art solutions used for pattern matching of sequences of real valued data (solved by the present proposal) are:

Continuity Relaxation: Most DTW-like algorithms follow a tight continuity constraint by defining a set of local constraints. Such constraints are used by a dynamic programming process to find the most appropriate alignment between the two time series. Given that these local constraints look only to the immediate vicinity of each pair of points from both time series, the accuracy of the results suffers whenever there are gaps in the similarity of the time series (e.g. very different silence regions between the same two spoken words) as the dynamic programming algorithm can get lost and not be able to connect the two highly similar subsequences in both time series. In present algorithm, it is allowed that some distance to exist between consecutive pairs of matching points assigned to the same matching path, therefore overcoming this problem. In order to disallow very distant spurious pairs of matching points and to constraint how much non-matching content should be allowed between two matching subsegments, we use a maximum non-matching length input parameter.

Computational complexity: The standard DTW algorithm was designed to compare two time series from start to end, allowing for a warping (or non-linear alignment) between these two known sets of points. Although faster implementations of this algorithm exist, these are all limited in that one needs to know a priori the start-end times for both time series. A simple modification of DTW called subsequence-DTW allows for one sequence to be searched for within a longer sequence where only one of the sequences is constrained to known start-end positions, while the other sequence is analyzed to find where the start and end points are to optimally match the constraints and overall matching score. These alternatives are still quite slow to compute as they need to consider all points in the unconstrained sequence as possible ending points through a dynamic programming technique that accumulates the overall optimal scores at each possible alignment position. Once both end points are set, subsequence-DTW algorithms need to track back through a stored decisions matrix to find the optimal starting points, incurring also in an important memory overhead. Some other algorithms have been proposed that can be used to search for matching subsequences within two bigger time series. The computational complexity of most of these algorithms is quite high and is bigger than any basic DTW algorithm, as most points in both sequences have to be considered due to the lack of knowledge of the start-end points.

Other prior art algorithms (see for example, Aren Jansen and Kenneth Church "Towards Spoken Term Discovery at Scale with Zero Resources") are able to reduce computation by: a) using a reference points indexing mechanism (based on the Locality Sensitive Hashing, LSH, algorithm) that allows for a very efficient retrieval of similar points of one of the series given a point from the other; and b) using image processing techniques on the sparse matrix of resulting matching points to identify start-end pairs of points where it makes sense to perform a standard DTW analysis in search for a matching path. However, in comparison to the present proposal, said approach is only an approximation to the optimal solution as they heavily rely on the accuracy of image-based techniques to find all possible matches. In addition, they still use a matrix memory structure, which limits the length of the search space as memory in current computers is not infinite.

Exhaustive search: In order to compare two time series most algorithms need to perform two tasks. First, they need to compute a similarity/distance matrix between all points in both time series. Then, they need to apply a dynamic Programming (DP) algorithm to find the suitable matching paths between the two sequences. Given that these steps are performed sequentially, the similarity matrix is first computed in its entirety even if some values might be irrelevant for the DP to find the optimum aligned subsequences. In our proposal we process the query time series sequentially and further process only those points from the other (reference) time series that are most similar to each query point. Other algorithms have taken steps towards avoiding the exhaustive search or computation of all distances between points in both time series but they still need to compute many distances that will not be used in the final possible paths, but that are needed to find locations where these paths might appear in the similarity matrix. Moreover, in the proposed algorithm each set of most similar reference points are processed right after querying for them, which allows to immediately release memory for those that are not useful and open the door to skip some query regions when the system determines that no matches can be expected.

Matrix memory requirements: All DTW-inspired algorithms that we are aware of need to store the similarities/distances between all points in both time series in a matrix structure in order to later apply some matching techniques to it in order to find possible matching paths. This limits the total amount of data that can be processed at once in the system as a matrix structure requires a minimum of N×M memory locations (where N and M are the number of points in both time series). Furthermore, as most algorithms need such matrix to be entirely computed before they can perform any further step, performing intermediate memory resets is not possible. On the contrary, the algorithm proposed in the present invention works entirely on the vector domain, storing all matches in a vector form and only keeping the information regarding possible paths (i.e. information regarding start, end or the path and the average score) and not all points that have initially been selected. This allows us to process much longer databases. In addition, as data in the vector becomes obsolete (i.e. we find the end of matching paths), the memory devoted to those paths is freed, thus dynamically reducing the total amount of memory we need to run the matching, regardless of the size of the time series. Finally, note that a circular array implementation in the proposed algorithm is possible, which can be used to define a priori the length of the vector we want to store into memory and virtually allow us for processing infinite databases, as the required memory is now bounded a priori by the designer.

Information retrieval alignment: Different from the DTW techniques, within the information retrieval community it is common to use techniques similar to the one proposed here for the alignment of sequences of data points. These algorithms are based on a vector structure implementation like in our proposal. These algorithms work by registering each found matching point between both time series into the vector. Once all matches have been registered, the locations of the vector with the highest number of matching points is thought to contain the most prominent lineal (diagonal) matches between both time series. By using some linear transformation on either time series we can use the same technique to check for linear alignments other than diagonal, but never when there is a nonlinear alignment between the sequences, like the DTW algorithm is able to do. This is the main difference between the proposed algorithm and standard Information retrieval implementations, as the proposed algorithm is capable of finding those non-lineal alignments between sequences while still using a vector of matches paradigm. Another difference is that when using standard information retrieval algorithms we need to define a classification front end to determine which pairs of points on both time series are considered matches (and therefore are registered in the vector of matches) and which are not. An accurate tuning of this front end is necessary to balance the number of missed true matches and false alarms. In the proposed algorithm, a method can be also defined to decide whether a time series pair is a match, although its selection is not crucial for the accuracy of the system, as the algorithm could be even setup to allow all pairs to be considered as matches. In this case the proposed algorithm would be performing the exact same processing as that done by a standard DTW which processes each pair to find the correct alignment. The reduction of the registered matching pairs by using some classification front end can be used as a method to increase speed while still obtaining the same results.

The embodiments of the invention stated below will overcome at least some of the drawbacks of the existing solutions. Although some of the embodiments and examples shown are applying this algorithm to speech, its principles are applicable to any domain where data can be represented as a time-series and a similarity metric can be established between the points of the time series.

SUMMARY OF THE INVENTION

The present invention proposed a method and system called information retrieval-based Dynamic Time Warping (IR-DTW), to find matching subsequences between two time series or real-valued data, overcoming the drawbacks found in the existing solutions.

In a first aspect a computer-implemented method of determining matching subsequences between a first sequence of values and a second sequence of values is provided. Said method comprising:
 inputting said first and second sequences of values into an algorithm, said algorithm defining a plane of points corresponding to said sequences of values,
 said algorithm identifying similar points on said plane according to a predefined similarity metric, and
 said algorithm grouping a plurality of said similar points between said two sequence values so as to define a path according to said alignment algorithm, and outputting a series of optimized matching subsequences according to predetermined path characteristic metrics, wherein
 said algorithm uses a one-dimensional vector structure of paths, and
 said paths have a non-linear alignment between said matching subsequences.

The result of the proposed algorithm will be a set of optimized matching paths (a set of sequences of matching points which represent possible optimal matches between both sequences)

In an embodiment, the first sequence of values is a first time series $Q=\{q_1; q_2; ; q_M\}$ and the second sequence of values is a second time series $R=\{r_1; r_2; \ldots; r_N\}$ of real valued n-dimensional vectors, where n is a design parameter.

In an embodiment said one-dimensional vector structure of paths is called $\Delta T$ and is set as void as start up and where said algorithm, an alignment algorithm, includes the following steps:
 a) For every vector, $q_i$, belonging to Q do:
  b1) Select the vectors in R which are considered most similar to $q_i$ according to the predefined similarity metric
  b2) For every vector $r_j$ belonging to the group selected in the previous step do:
   b21) Set a variable $k=tr_j-tq_i$, where $tq_i$ and $tr_j$ are the offsets of vector $q_i$ and $r_j$ from the start of their respective sequences.
   b22) Set a variable best_path=$(q_i, r_j)$
   b23) For k'=k−WRange to k+WRange, where Wrange is a design parameter do:
    b231) Set a variable $p=\Delta T(k')$
    b232) Determine if the offset between vector pair $(q_i, r_j)$ and p is less than a predefined first threshold, and if so,
    b233) Determine if the vector pair $(q_i, r_j)$ meets a predefined set of warping constraints with respect to p and if so,
    b234) Select the best path according to a first path characteristic metric, between the path composed by adding the vector pair $(q_i, r_j)$ to p and the path stored in best_path and set the variable best_path as the path selected b235) Go to step b231) for the next value of k' b24) ΔT(k)=best_path b25) Go to step b21) for the next value of $r_j$ b3) Go to step b2) for the next value of $q_i$ In an embodiment, a post-processing process of the matching paths obtained is made, adding some extra constraints. In this case, for example, the method further comprises a step c) comprising: for all the paths registered in ΔT, calculate a second path characteristic metric and including in a set of optimal paths, only the paths whose second path characteristic metrics meet a predefined criteria. The path characteristic metrics may be selected for example, from one of the following: the number of matching points in the path, the accumulated distance of the points in the path, average similarity of the points in the path, path length, a combination of these criteria or any other appropriated metric.

In an embodiment, the method further comprises a step d) comprising: when a path is selected to be included in the set of optimal paths, checking if there is any path already included in said set in strong overlap with the new one, and if so, merging the new path with the path found to obtain a merged path and instead of including the selected path, including the merged path in the set of optimal paths and deleting the path found in strong overlap with the new one from the set of optimal paths.

In an embodiment, if the offset between vector pair ($q_i$, $r_j$) and p is not less than the predefined first threshold, the second path characteristic metric is calculated for path p and said path is included in the set of optimal paths if its path metric met the predefined criteria.

In an embodiment, where the step of selecting the vectors in R which are considered most similar to $q_i$ according to the predefined similarity metric, comprises: calculate the predefined similarity metric between $q_i$ and each of the vectors of R and selects said vectors of R whose predefined similarity metric with $q_i$ is less than a predefined second threshold. The predefined similarity metric may be the Euclidean distance, the inner product or any other distance or similarity between vectors.

In an alternative embodiment, the step of selecting the vectors in R which are considered most similar to $q_i$ according to the predefined similarity metric is performed using an Information Retrieval based algorithm to allow for fast retrieval of similar vectors, like for example the Locality Sensitive Hashing algorithm.

In an embodiment, the step of determining if the offset between vector pair ($q_i$, $r_j$) and p is less than a predefined first threshold, called maxQDist, comprises: determining if $tr_j - p \cdot tr_{end} <$ maxQDist and $tq_i - tq_{end} <$ maxQDist, where $p \cdot tq_{end}$ and $p \cdot tr_{end}$ are the offset of points $q_{end}$ and $r_{end}$ from the start of their respective sequences and $r_{end}$, $q_{end}$ is the last matching point of the path p.

The step of determining if the vector pair ($q_i$, $r_j$) meets a predefined set of warping constraints with respect to p, may comprise:

determining if $tr_j - p \cdot tr_{end} >= 0$ and $tq_i - tq_{end} >= 0$, where $p \cdot tq_{end}$ and $p \cdot tr_{end}$ are the offsets of points $q_{end}$ and $r_{end}$ from the start of their respective sequences and $r_{end}$ $q_{end}$ is the last matching point of the path p or may comprise:

determining if $tq_i - tq_{end} >= (tr_j - p \cdot tr_{end})/2$ and $tq_i - tq_{end} <= 2*(tr_j - p \cdot tr_{end})$, where $p \cdot tq_{end}$ and $p \cdot tr_{end}$ are the offsets of points $q_{end}$ and $r_{end}$ from the start of their respective sequences and $r_{end}$, $q_{end}$ is the last matching point of the path p.

The vector ΔT may be implemented as a circular buffer of length L, where the path in position k will be stored in ΔT in location l, where l is the remainder from the division of k by L.

The offsets may be time offsets (temporal offsets), for example the time difference between a point and the start point of the sequence (of course, in this case the points should have associated a certain time instant). It can be also the place (the order) of the point in the sequence.

The offset of a certain point in the sequence may also be defined as the number of data points from the start of the sequence.

Other types of offset definition may be used. For example, in the case, that the data points are samples or feature vectors of an audio or speech signal belonging to a certain frame, the offset can be defined by the difference in frames, that is, the difference between the number of frame to which the data vector belongs and the number of frame to which the first data vectors of the considered sequence belongs.

In another aspect, a system comprising means adapted to perform the above-described methods is presented.

Finally, a computer program comprising computer program code means adapted to perform the above-described method is presented.

Consequently, according to the invention, a method, system and computer program according to the independent claims are provided. Favorable embodiments are defined in the dependent claims.

For a more complete understanding of the invention, its objects and advantages, reference may be had to the following specification and to the accompanying drawings.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but rather as an example of how the invention can be embodied. The drawings comprise the following figures.

Corresponding numerals and symbols in the different figures refer to corresponding parts unless otherwise indicated.

DETAILED DESCRIPTION OF THE INVENTION

The present invention proposes an improved pattern matching method and system.

Said improved matching method and system determines the matching subsequences between a first sequence of values and a second sequence of values using an alignment algorithm which defines a plane of points corresponding to said sequences of values. Such alignment algorithm identifies similar points on said plane according to a predefined similarity metric, groups a plurality of said similar points between said two sequence values so as to define a path according to said alignment algorithm, and outputs a series of optimized matching subsequences according to predetermined path characteristic metrics. Said alignment algorithm uses a one-dimensional vector structure of paths, and said paths have a non-linear alignment between said matching subsequences.

The predetermined path characteristic metrics used, may be path length or average similarity of points belonging to said path or any other type of metric which can be used to measure the characteristic of a path.

The predefined similarity metrics used may be a distance as Euclidean distance or dot product or any other distance or similarity between points on said plane The alignment algorithm used in the proposed method and system has been called information retrieval-based Dynamic Time Warping (IR-DTW) as it is partially inspired in information retrieval and Dynamic Time Warping techniques.

The main steps of an embodiment of said IR-DTW algorithm is shown in the below disclosed algorithm 1. Two sequences are considered. At a high level the algorithm performs a search for sub-sequences of an input time series $Q=\{q_1, \ldots, q_M\}$, that optimally match subsequences of another given time series $R=\{r_1, \ldots, r_N\}$ A time series is a sequence of data points which maintain an order among them. Said order can be the time instants at which the values have been measured or any other kind of order can be considered. Said data points or data values ($q_i$ and $r_j$) may be real valued n-dimensional vectors. They can be simple data numbers (n=1) or they can be more complex data vectors (n>1).

The data points, also called data vectors, ($q_i$ and $r_j$), can be for example, samples in time of a signal or the features vectors of a signal that represent the temporal and spectral behavior of the signal respectively or any other type of values. Said signals can be for example, speech or video signals.

The time series can be as well, for example, nucleic acid strands (RNA strands or DNAs strand) and, in said case, the data points are the nucleotides of the nucleic acid strand which have a certain order in the nucleic acid strand.

Hence, the sequences considered in the present invention can correspond to speech or video signals, nucleic acid strands or any physical entity where data can be represented as a sequence of data points (n-dimensional vectors) that maintain an order among them.

To perform said optimal match, it uses a vector structure $\Delta T$ where very similar pairs of vectors from both time series (one vector from the first time series and one vector from the second time series) with high similarity are registered. In this text, a pair of data vectors, one data vector from each time series, will be referred as a matching point and a sequence of matching points will be referred to as a path.

The result of the proposed algorithm will be therefore a set of optimal matching paths (a set of sequences of matching points which represent possible optimal matches between both time series)

---

Algorithm 1 IR-DTW: Information Retrieval-based Dynamic Time Warping

---

Input: $Q$, $R$ time series, maxQDist parameter
Output: $\mathcal{P}$ set of matching paths
  $\Delta T \leftarrow \emptyset, \mathcal{P} \leftarrow \emptyset$
  for all $q_i \in Q$ do
    $R' \leftarrow$ best_points($R$, $q_i$) {Step 1}
    for all $r_j \in R'$ do
      match_point $\leftarrow \{tq_i, tr_j, d(q_i, r_j)\}$

---

Algorithm 1 IR-DTW: Information Retrieval-based Dynamic Time Warping

---

$\Delta T \leftarrow$ InputMatch(match_point, maxQDist) {Step 2}
    end for
  end for
  for all $k \in \Delta T$ do
    $\mathcal{P} \leftarrow \mathcal{P} \cup$ process&extract($\Delta T[k]$) {Step 3}
  end for

---

The IR-DTW algorithm performs a single forward pass, sequentially evaluating all the query points $q_i$ in Q in two steps.

In the first step it searches for the list of reference points $R' \in R$ that are most similar (e.g. less distance of higher similarity) to query point $q_i$, therefore obtaining a set of matching points. The selection of the method used to obtain these points (i.e. the best_points function) is not crucial for the overall system, but carefully choosing it can considerably speedup the process. In the initial tests this search is performed exhaustively by computing the distance between the query point $q_i$ and every reference point in R and applying a threshold. In later implementations, an LSH, Locality Sensitive Hashing, algorithm (as disclosed for example in Aristides Gionis, Piotr Indyk, and Rajeev Motwani, "Similarity Search in High Dimensions via Hashing," in *Proc. International Conference on Very Large Databases,* 1999, pp. 518-529) to speedup the retrieval of similar reference points could be used. Every query point $q_i$ and matching reference point $r_j \in R'$ constitute a matching point, which is uniquely identified by their offset $tq_i$, $tr_j$ from the start of their respective sequences, and relate to each other with their distance/similarity $d(q_i,r_j)$.

Said offset can be measured in different ways. For example, it can be measured as a time difference between a point and the start point of the sequence (of course, in this case the points should have associated a certain time instant) or the place (the order) of the point in the sequence or any other type of offset.

In an embodiment, the offset of a certain point in the sequence is measured as the number of elements (data points) from the start of the sequence.

Any well known distance definition could be used, for example the Euclidean distance or the inner product similarity, but other distances are possible (for example, a possible distance definition is $$d(q_i, r_j) = -\log\left(\frac{q_i \cdot r_j}{\|q_i\|\|r_j\|}\right)$$

where the dot is the inner product between the vectors, and the ∥ is the module). Note that for convenience in the explanation of the algorithm, it has been chosen to use a single query time series and a single reference time series. The same algorithm can be applied to the case that multiple reference time series should be searched for by simply concatenating all their values and keeping track of the start points and ID's of each time series in a separate structure in order to assign the resulting matching points to the corresponding file ID.

The main advantage of this algorithm is that by using a vector form, building a similarity matrix can be avoided and all sequence alignments can be performed within the vector. This results in important savings in memory, which is one important limitation of standard DTW algorithms on large time series.

The "match_point" variable used in algorithm 1 is not a matrix, but it is an variable parameter that, each time, corresponds to a match point between query and reference time series. For a given matching point $(q_i, r_j)$ being analized, the "match_point" variable stores the offset in the query, the offset in the reference and the distance/similarity, $d(q_i,r_j)$ between them. This information is all that is needed for the algorithm to process the matching point. the distance/similarity stored in "match_point" may be the same distance/similarity used before to find the most similar points, but another definition of distance/similarity can be used in this step.

In the second step of algorithm 1 the matching points found in the first step are inserted into appropriate locations in the vector structure $\Delta T$, possibly extending one of the matching paths stored there, by using a novel technique (explained below) that allows to detect non-linearly time-warped matching sequences between both time series.

The general idea to use a vector structure where matching points are registered and matching segments are finally retrieved from is inspired on the information retrieval techniques to linearly align time series. All matching paths stored in vector $\Delta T$ are defined by their start-end times and their overall average score. Note that although we refer to the stored and retrieved items as matching paths, for the algorithm to succeed in finding matching sequences it does not need to store the values of all matching points that form a matching path, therefore the result of the algorithm will only contain the matching start and end times within both time series. Such implementation allows for very important memory savings for the algorithm. If needed, it is trivial to, in addition, store the matching points for each matching path or to compute a posteriori standard DTW alignment between the two time series (this time with known start-end points) thus obtaining such intermediate points. Without any extra constraint in the algorithm, the final matching paths returned by the algorithm (in $\Delta T$) would be allowed between any subsequence of time series values. Some extra constraints may be applied regarding the minimum length, number of matching points and minimum average score in order to consider them as plausible matches, thus reducing the false alarm rate of the system. Such postprocessing is done in the process&extract( ) algorithm. This post-processing is done within step 2 whenever a matching path is considered that cannot grow anymore, or in step 3, which scans all $\Delta T$ to find any remaining matching paths. This algorithm is further explained later in this text.

The novelties proposed are mainly in the second step, which is the core of the IR-DTW algorithm, and is in charge of obtaining plausible matching paths between two time series given the set of matching points between these series. The algorithm receives as an input two time series and returns as an output a set of resulting matching paths (also referred to as matching sequences) that are considered as plausible matches between the time series. The number of returned paths depends on the characteristics of the signals and ranges from 0 to several.

In addition to the standard use, the algorithm can be adapted for various different use cases, for example the search for full queries in a query-by-example system, to process online input audio in a command-and-control system, as an offline processing tool to find repetitive audio patterns for summarization or comparison between audio documents, etc.

Now, the traditional Information Retrieval (IR) based diagonal matching technique is going to be briefly described as a basis to understand the proposed algorithm. Such description will be tied to the explanation of the proposed algorithm as some concepts are shared.

A typical implementation of the IR algorithm has the same structure to the one in Alg. 1 where the main difference with our method is in step 2, which is described next for the traditional IR case.

A vector structure $\Delta T$ is used in all these algorithms to convert a set of found matching points into possible matching paths by joining together those matching points that are thought to belong to the same matching path. The result the algorithm is a set of possible matching paths between two time series, which might later be further reduced if further constraints where the properties of these paths (minimum length, density of points, recomputed score between all points in the path) are taken into consideration.

In general, given the vector structure $\Delta T$ and a matching point $(q_i,r_j)|q_i \in Q; r_j \in R$, the position where such match is inserted in $\Delta T$ is defined as $k=tr_j-tq_i$ which is the relative distance (from the start of the query and the reference) of the current matching point. In a traditional IR-based matching implementation, a similar $\Delta T$ vector implementation has been extensively used in the past to find matching subsequences between two time series where there is a diagonal/linear matching between the two signals (i.e. the elapsed time between consecutive matching points in each sequence is constant) as they will accumulate in the same position in the $\Delta T$ vector and can be found with a simple scan for maxima in the vector. To illustrate this let us consider two consecutive matching points $(q_1,r_1)$ and $(q_2,r_2)$, with a relation between them $tq_2=tq_1+\alpha$ and $tr_2=tr_1+\beta$ here $\alpha$ and $\beta$ are the offsets between both points. If $\alpha=\beta$ then $k_1=tr_1-tq_1$ and $k_2=tr_2-tq_2$ will be equal and therefore registered in the same location in the $\Delta T$ vector. This will also happen for all subsequent points $(q_i,r_j)$ in query and reference series with the same offsets among them. If $\alpha \neq \beta$ but there is a constant relationship between them for a sequence of consecutive matching points, this simple representation can be still used by first applying a linear transformation to all points in one of the time series to make the offsets $\alpha$ and $\beta$ equal before registering the resulting points in the $\Delta T$ vector. Note that this later case is very typical of music pieces played in the radio, which are consistently played at a slightly higher speed than their original one.

Figure 1A:
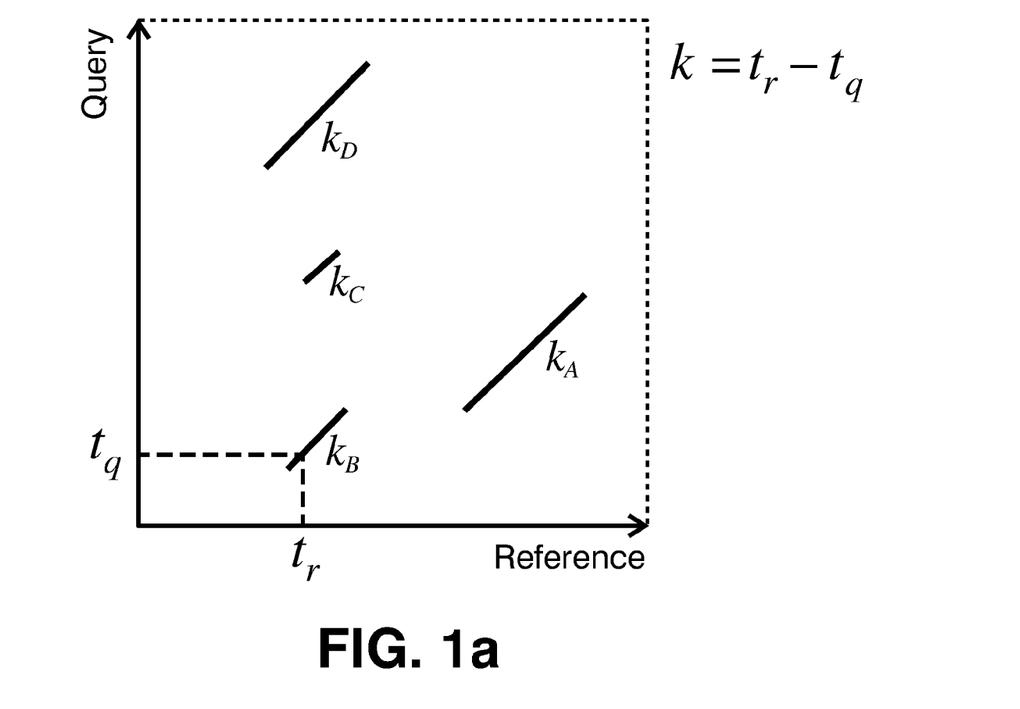
FIG. 1a shows, the representation of matches in two time series, where the axes represent the time steps in both time series, applying a traditional Diagonal Information retrieval algorithm
Figure 1B:
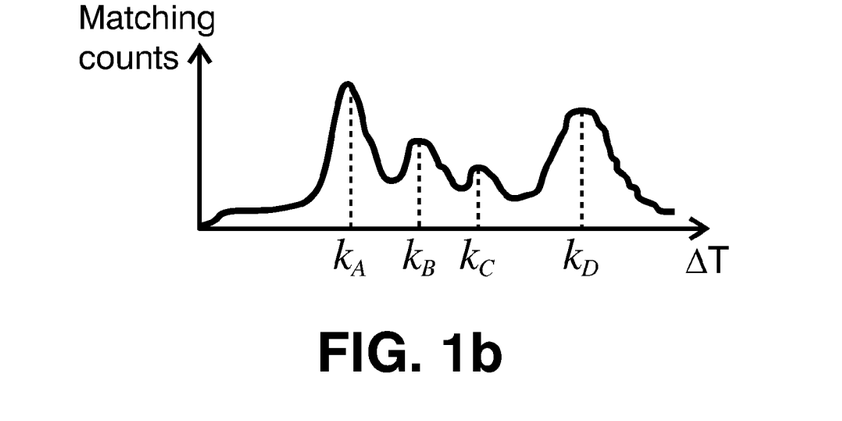
FIG. 1b shows the ΔT representation of the matching paths in both time series.

Given every possible pair of points $(q_i,r_j)$ within the two time series, first a method needs to be applied to determine which pairs are considered matching points. This can be done either by applying a threshold to the distance $d(q_i,r_j)$ or by means of other indexing techniques to select most similar points in one time series given a point from the other. Then each of these matching points will be inserted into the $\Delta T$ vector. In order to increase efficiency in the storage requirements of these registered matching points, usually whenever a given position k in the $\Delta T$ vector already contains a preexisting matching path, the new matching point is registered at the end by creating a longer matching path. Such matching path will contain information regarding where it started (i.e. the initial matching point in both time series), where it currently ends (i.e. the last inserted matching point), the number of matching points registered so far in that path and the accumulated similarity (or distance) of all matching points in the path. An example of this can be seen in FIGS. 1a and 1b where a similarity matrix is computed between all pairs in both time series and the best diagonal lines are found using the $\Delta T$ accumulator vector. FIG. 1a shows the typical representation of matches in two time series, where the axes represent the time steps in both time series, forming a matrix of all positions between both time series where matches can be found. Any patching path between both series is seen graphically as a subset of connected points in the matrix. On the other hand, in FIG. 1b we see the $\Delta T$ representation of the matching paths in both time series. In this traditional implementation we expect that any diagonal matching path between both time series will result in a maxima in the curve created by the number of matches of matching paths created in each $k_j$ position.

Several simple modifications of this method can be proposed, which will also be useful for the proposed algorithm.

First, the step size in the $\Delta T$ vector may be increased so that it requires less space in memory and multiple original time differences between query and reference points will fall within the same location in the vector. By default, $\Delta T$ has a step size of one time series element as defined by the possible values that $k=tr_j-tq_i$ can take. If the step size is made bigger, for every location k, it should be computed which is the new location in $\Delta T$ where a given match should be inserted. This is done by defining the step size as $\gamma$ (note that $\gamma=1$ corresponds to the original $\Delta T$ vector) and applying a positioning formula like $k'=k/\gamma$.

Second, all matching paths registered in the $\Delta T$ vector can be forced to contain matching pairs close enough together, meaning that whenever a new matching point is about to be inserted into a location with an already existing matching path, if it is too far from the last matching point in that path, the existing path is first closed and a new one is started. In speech this happens when two audio sequences match for some time, then a long enough region is found not to match (maybe due to silence or other spoken words), to be followed by a new set of matches with the same k value than the previous, although these might not be suitable to be considered as part of the previous matches.

The obvious drawback of this standard matching technique (which is solved by the proposed technique) is that it only allows us to find linear matches between time series, while it is usual to find many time series with nonlinear optimal alignments.

The proposed algorithm uses the advantages of the compact representation used by this algorithm and the capacity of DTW algorithms to match time series with non-linear warping paths, as will be described next.

Now, the proposed algorithm will be described in detail. Said algorithm builds upon some ideas from the information retrieval diagonal matching algorithm (just described) and the DTW non-lineal matching capabilities. When applying the traditional diagonal matching algorithm described above to time-warped signals, even though the matching points inserted in $\Delta T$ might correspond to a feasible continuation of an existing matching path, they will not all fall within the same position in $\Delta T$, therefore not creating a recognizable peak at the end of the processing. For this reason an algorithm is proposed, that allows us to register the incoming matching points in $\Delta T$ so that we make sure that at the end we will still be able to recognize the optimum matching paths, even if they come from a non-lineal mapping between both time series. The algorithm presented now (algorithm 2) will correspond to step 2 of algorithm 1 above.

Algorithm 2 InputMatch: Insertion of matches into $\Delta$ T

```
Input: match point m = {tq_i, tr_j, d(q_i, r_j )}, maxQDist
Output: Δ T with inserted match_point
    k        tr_j - tq_i
    best_path    m
    for k⁰ = k - WRange to k + WRange do
        p        Δ T[k⁰]
        if assert_relevance (maxQDist, m, p) == PASS then
            if assert_warp(m, p) == PASS then
                best_path = choose_best{best_path, (p [ m)}
```

Algorithm 2 InputMatch: Insertion of matches into $\Delta$ T —continued

```
            end if
        end if
    end for
    Δ T[k]         best_path
```

Algorithm 3 assert_relevance (maxQDist, match_point, match_path): asserts whether a given path is close enough to a given matching point

```
Input: match_point= {tq_i, tr_j, d(q_i, r_j)}, match_path, maxQDist
Output: bool={PASS, FAIL}
    Δq ← |tq_i - match_path.tq_end|
    Δr ← |tr_j - match_path.tr_end|
    if Δq < maxQDist & Δr < maxQDist then
        return(PASS)
    else if Δq > maxQDist then
        process&extract(match_path)
    end if
    return(FAIL)
```

Algorithm 2 describes the proposed process of inserting a matching query-reference pair $(q_i,r_j)$ into the $\Delta T$ vector. Its input parameters are the match point variable m (as explained before, composed of the time positions of query and reference points, and the distance/similarity between them) and a system parameter maxQDist which indicates the maximum time difference that is going to be allowed between two consecutive matches (in either reference or query) in order to consider that they belong to the same matching path. The $\Delta T$ vector is composed of one matching path for each position k.

Said matching path will be defined by (in other words, in each $\Delta T$ position, will be stored the following information): the start position in the query sequence and in the reference sequence (that is, the path start point), the end position in the query sequence and in the reference sequence (that is, the path end point), the number of matches (that is, the number of points of the path) and the accumulated distance d (r, q) between the points of the paths. Each path will be stored in $\Delta T$ in a position k, which will correspond to the difference between the offsets of the final point of the path, that is k: $tr_{end}-tq_{end}$ Each path stores the best matching path whose final query and reference ending times follow $tr_{end}-tq_{end}=k$. Logically, all paths are empty (the variables are set to void), that is, the paths do not contain any matching point, at the start of the algorithm.

First, in Alg. 2, the location $k=tr_j-tq_i$ is computed, where the input matching point will be considered for insertion in $\Delta T$.

The main difference of the proposed algorithm with the traditional IR diagonal matching algorithm is that it is considered not only the current (diagonal) path as a prior to the matching point to be inserted in position k, but also a set of paths that might contain the current match through some allowed warping. In order to account for such warping we define a range of values around position k where possible alternative warped paths are searched for. The chosen range is defined as k'=[k−WRange,k+WRange]; the reasoning behind this region and the values that WRange can take, will be later explained.

The final path to which the current matching point will be added to will finally be stored in position k in vector $\Delta T$, substituting any preexistent matching path at that point. This is equivalent to the selection of the winning path selected to continue through any particular point in the standard DTW matrix implementation although in this case we allow for warped matching paths to also continue in a given position k. Note that it is possible to account for some warping in the alignment in this vector form because we are processing the query sequentially, i.e. for every given point in the query when we process it we are ensured that all points before it in the time series have been already processed. Given the multiple matching paths within range of a position k (one path per position) that are evaluated as possible warping paths for the current matching point, the chosen one needs to pass the following three tests: a) it needs to remain relevant at the current time (computed with the function "assert-relevance( )"); b) it needs to fall within the considered warping constraints (computed with the function "assert_warp( )"; and c) it is the best among all paths that also pass the previous two tests (computed with the function "choose_best( )"). Next we will describe each of these tests in more detail.

a) Path Relevance Test: For every non-empty path within the defined range in $\Delta T$ we first check whether the existing path is relevant at the current time (as shown in Algorithm 3), to avoid big gaps between consecutive matches assigned to a path. Such gaps correspond to long temporal regions where the two time series do not contain aligned matches for a given path. Several metrics can be used for this purpose, involving both the time elapsed without matches in the query and the reference. In one embodiment, the conditions $|tq_i - \text{match\_path} \cdot tq_{end}| < \text{maxQDist}$ and $|tr_j - \text{match\_path} \cdot tr_{end}| < \text{maxQDist}$ are applied which evaluates whether the elapsed time between the ending times of the stored path and the current match query and reference times are smaller than the maxQDist input parameter. Moreover, given that the query is processed sequentially and progressively in time (i.e. $tq_i < tq_{i+1} \forall i$) whenever $|tq_i - \text{match\_path} \cdot tq_{end}| < \text{maxQDist}$ we can assure that the path being evaluated will not be able to comply with the condition for any other point. Therefore we can extract these paths from $\Delta T$ and process them to check whether they define a good match between both time series (done using the function "process&extract( )").

b) Warping Constraints Test: Next, for those paths that could be considered prior paths leading to the current match, a second test is applied to check whether the warping conditions are met. Warping conditions define what behavior is acceptable for paths and is equivalent to the local+global constraints in standard DTW algorithms. If the warping conditions evaluated in assert_warp( ) are successfully met, we consider the path in position k' as a possible warping path for the current matching pair. Two possible warping conditions are described below in this document, although other warping conditions could be proposed.

c) Selection of the Best Prior Path: For any given match with location k in the $\Delta T$ vector, only one warping path will be assigned to that position and continued by the input matching point. The difference with the traditional IR-based diagonal matching algorithm is that, in said algorithm, it is always the diagonal path in k (if any) that is extended with the current matching point. In the proposed algorithm, it is selected among all possible paths within warping range that meet the warping conditions and pass the path relevance and path warping tests. Then, such matching path is placed in k and extend it with the current match. If there are no candidate paths (e.g. at the start of the query) the current match is placed in k forming its own path, with count i. Function $\text{choose\_best}(path_i, path_j)$ in Alg. 2 is used to compare any two possible paths and select the best one according to some comparison metric $S_p$. The two paths are compared given their characteristics to select which one acts as a prior path to the current point under dispute. Any know comparison metric could be used. One of the possible metrics to use is to select the path with highest count ($count_i$) of inserted matching points, that is, the number of points in the path (i.e. the score of each path will be the number of points in the path and the path with higher score will be selected), note that the actual length of the path in the query or reference sequences should not be used in order not to emphasize sparse paths, with long gaps between matches; another metric which can be used is to take into account the average score of the matches in the path as $$\frac{dist_i + \alpha \max Thr}{count_i}$$

where $dist_i$ is the accumulated distance of matches in the path, maxThr is a constant, and is defined as the maximum distance between any two points considered as matching points, and count, is the number of matching points in the path. The parameter $\alpha$ is a penalty factor (e.g. set around 5). This second metric penalizes short paths versus longer paths. Of course, other metrics can be used. Note that only using the normalized distances/similarities as in a standard DTW algorithm is not possible here as there are no a priori constraints on the minimum length of comparing paths where longer paths will probably have lower averaged scores.

Now the postprocessing process (that is, the process&extract function) will be explained.

The procedure "process&extract( )" is launched for a matching path either from process "assert_relevance( )" in algorithm 2 (when a path is found to be too far from the current point which we are currently analyzing and it is ensured that the path will not get closer in the future) or in the last step (step 3) in algorithm 1, which analyzes all remaining matching paths in the $\Delta T$ vector to find those that could be considered suitable output matches.

This procedure allows us to run the algorithm with limited memory requirements as memory is dynamically freed as the processing of the input query progresses. Once the process&extract procedure is launched and a path is eliminated from $\Delta T$, the path post-processing step in "process&extract( )" evaluates such path (involving applying a threshold to its length, matches density or normalized score) to determine if it can be considered a good match between both time series. In addition, it is possible also to check the list of already chosen matching paths to see whether any preselected path is in strong overlap with the newly processed one, and decide how to merge them if any is found. The overlap detection algorithm is a optional addendum to the algorithm that ensures that unique matching paths are returned as a result of running it. In cases like speech processing this is a fundamental algorithm as the speech signal is by nature very redundant (consecutive acoustic frames are usually similar to each other) and thus many possible matching paths are usually created, with a high level of overlap between them. Given any two matching paths, they are considered in overlap if the percentage of time that their start-end times (both in query and reference) are coincident with each other is higher than a certain predefined value X (we set X=0.5 in our implementation). Several formulas can be used to compute the overlap percentage. Given two matching paths defined by their start-end times $(tr_1^{start}, tq_1^{start}) - (tr_1^{end}, tq_1^{end})$ and $(tr_2^{start}, tq_2^{start}) - (tr_2^{end}, tq_2^{end})$, we define the percentage of overlap as $$\frac{\min(tq_1^{end}, tq_2^{end}) - \max(tq_1^{start}, tq_2^{start})}{\min(tq_1^{end} - tq_1^{start}, tq_2^{end} - tq_2^{start})}$$

for the query, and $$\frac{\min(tr_1^{end}, tr_2^{end}) - \max(tr_1^{start}, tr_2^{start})}{\min(tr_1^{end} - tr_1^{start}, tr_2^{end} - tr_2^{start})}$$

for the reference. In an embodiment, when two matching paths are found to be in overlap, the one path with better score is selected as a result, eliminating the other one.

Figure 2:
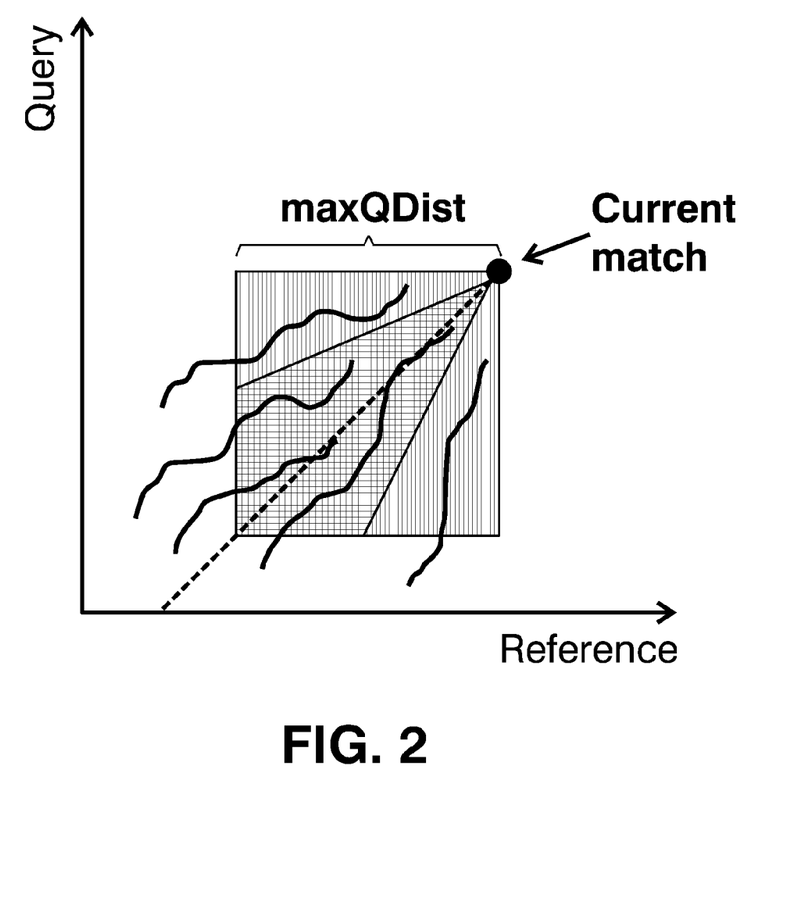
FIG. 2 shows the selection of the best prior matching path for a particular match done by the proposed algorithm, represented within the query-reference axis.

FIG. 2 shows graphically the selection of the best prior matching path, between several paths leading to one point, for a particular match done by the proposed algorithm and represented within plane created by the query and reference, as in a standard DTW implementation. The darker areas indicate the regions of interest where the algorithm searches for paths to be priors of the current match, as enforced by the warping conditions and the path relevance condition. The horizontal and vertical size of both areas corresponds to the relevance condition.

Now, the warping conditions to be used in the warping constraints test, in one embodiment of the present invention are going to be explained.

In the traditional diagonal matching when a new matching point is inserted into the ΔT vector, any previous matching path in position k is considered as a possible prior, and only the condition of path relevance can prevent (if enforced) that the current matching point is considered as a continuation of that matching path and added to it. In the proposed algorithm the prior matching path at location k is not the only one considered, but also all matching paths in the surroundings according to a warping range. In the proposed algorithm, for every path in the vicinity of position k we only consider it as a possible warping path if it abides with a set of warping conditions defined by the designer. Such warping constraints are standard in the traditional DTW algorithms, where they are classified into local constraints (immediate surrounding of any match) and global constraints (globally, defining the region of maximum warp of a final time series alignment path).

In principle any set of warping constraints can be defined, although for the alignment of speech signals two constraints are the most used, which are here defined.

Relaxed Warping Constraints: Similarly to the standard local constraints used in the DTW algorithm, the relaxed warping constraints imposes that any prior path complies with the monotonicity property (i.e. $tq_{i+1} > tq_i$ for all i values and $tr_{j+1} > tr_j$ for all j values). Algorithm 4 describes how these constraints have been applied.

---

Algorithm 4 assert_warp(match_point, match_path):
Warping assessment for the relaxed warping constraints

---

Input: match_point= $\{tq_i, tr_j, d(q_i, r_j)\}$, match_path
Output: bool={PASS, FAIL}
    Δq ← $tq_i$ − match_path.$tq_{end}$
    Δr ← $tr_j$ − match_path.$tr_{end}$
    if Δq ≥ 0 & Δr ≥ 0 then
        return(PASS)
    else
        return(FAIL)
    end if

---

Given two points, $p_1=(q_1,r_1)$ corresponding to the current matching point, and $p_2=(q_2,r_2)$ corresponding to the last query-reference point for a matching path being considered as a prior, the relaxed warping constraint requires that $p_1$ appears later (in query and reference) than $p_2$. Let $\Delta q=tq_1-tq_2$ and $\Delta r=tr_1-tr_2$ and be the distance in query and reference axes between $p_2$ (the last point in the matching path) and $p_1$ (the current matching point). The relaxed warping constraint can be written as $$\Delta r \geq 0$$

and $$\Delta q \geq 0 \quad (1)$$

The graphical interpretation of this constraint within the query-reference matrix can be seen in the outer warping region in FIG. 2. (i.e. the square-shaped region)

Strict Warping Constraints: The strict warping constraints require that at any given time, in addition to abiding with the monotonicity constraint described above, the warping of any one time series to be aligned with the other can not be greater than double. In speech data, this constraint expects that the time taken to speak twice the same word will not differ in more than two times the shortest one. The graphical interpretation of such constraint within the query-reference matrix can be seen in the inner warping region in FIG. 2 (i.e. the diamond-like shape region) and the practical implementation of these constraints is defined in Algorithm 5.

---

Algorithm 5 assert_warp(match_point, match_path): Warping
assessment for the strict warping constraints

---

Input: match_point = $\{tq_i, tr_j, d(q_i, r_j)\}$, match_path
Output: bool = {PASS, FAIL}
    Δq ← $tq_i$ − match_path.$tq_{end}$
    Δr ← $tr_j$ − match_path.$tr_{end}$     if $\Delta q \geq \frac{\Delta r}{2}$ & Δq ≤ 2Δr then         return(PASS)
    else
        return(FAIL)
    end if

---

Figure 3:
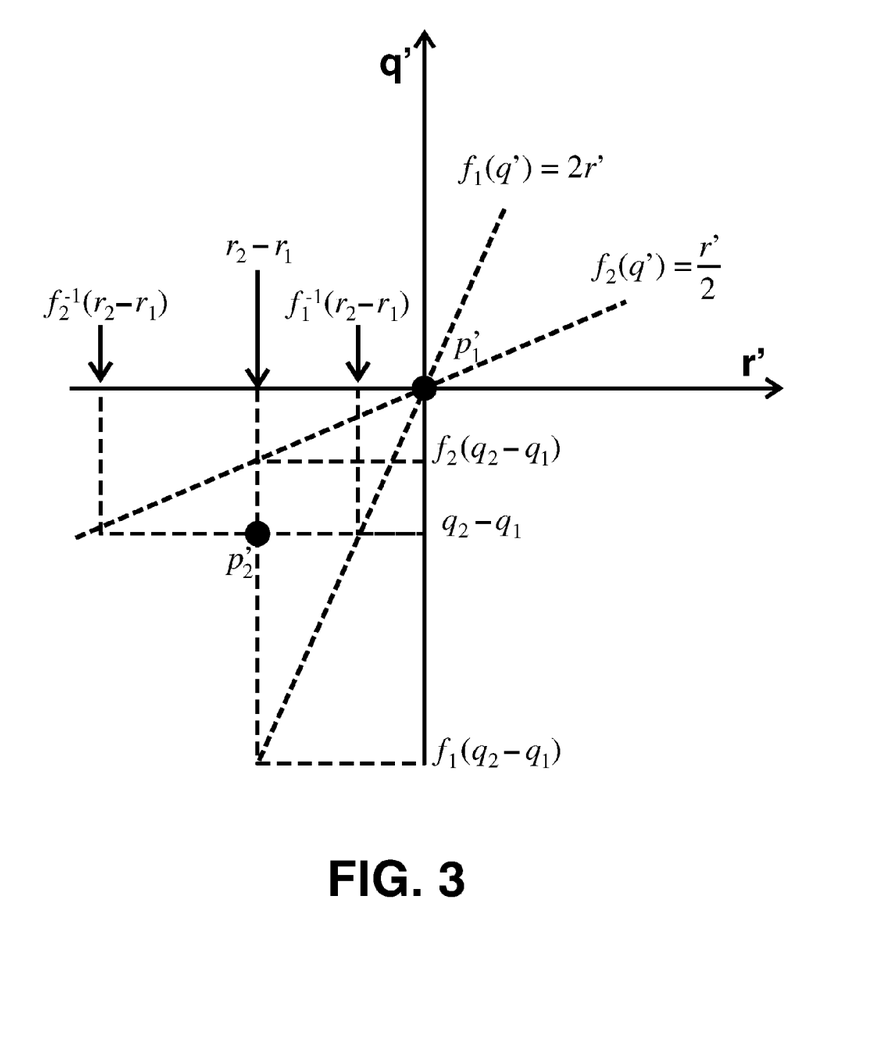
FIG. 3 shows graphically the strict warping constraints to be used in one embodiment of the present invention.

In order to derive the constraints to be applied to the possible prior paths in ΔT let us consider two sets of points, $p_1=(q_1,r_1)$ corresponding to the current match, and $p_2=(q_2,r_2)$ corresponding to the last query-reference pair for a path being considered as a prior, both placed within the q-r axes representing points in the two time series. In FIG. 3, it has been performed an axes transformation $q'=q-q_1$; $r'=r-r_1$ to obtain $p_1=(0,0)$ in the center of the axes, resulting in $p_{2'}=(q_2-q_1,r_2-r_1)$. It can be ensured that point $p_{2'}$ falls within the warping constraints if both vertically and horizontally it lies within the curves defining the warping edges. This gives the warping constraints as shown in equation 2.

$$f_1(q_2-q_1) \leq (q_2-q_1) \leq f_2(q_2-q_1)$$

$$f_2^{-1}(r_2-r_1) \leq (r_2-r_1) \leq f_1^{-1}(r_2-r_1) \quad (2)$$

$f_1$ and $f_2$ will be the functions which define respectively the lines of maximum and minimum warping allowed.

In order to simplify, in this particular embodiment these lines describe the boundary of warping one signal to double the other, and vice versa.

By performing, for this embodiment, the operations and grouping equivalent terms, equation 3 is obtained.

$$2(r_2 - r_1) \le (q_2 - q_1) \le \frac{(r_2 - r_1)}{2} \qquad (3)$$

This is equivalent to the formula $2(tr_2-tr_1)<=(tq_2-tq_1)<=(tr_2-tr_1)/2$ where a more similar notation to the one used throughout this document is used.

Note that equation 3 has been obtained for the particular case where $f_1$ and $f_2$ limit the warping to two times the other signal.

A more compact representation of the warping constraints can be derived from equation 3 by using the time differences between query and reference points of the matching point and the final times of the matching path, as can be seen in equation 4.

$$\frac{\Delta r}{2} \le \Delta q \le 2\Delta r \qquad (4)$$

One of the parameters which must be carefully selected in the present algorithm is the warping range, WRange. Given a new matching point that is going to be inserted into position k in the ΔT vector, the warping range defines the set of positions around position k where possible prior warping paths are searched for. The chosen range is defined as k'=[k−WRange, k+WRange].

A relation can be found between the desired value of such range and the maxQDist parameter (which determines the maximum gap between consecutive matches falling within the same path). Given a match point $p_1=(q_1,r_1)$ and any path whose last registered match point is $p_2=(q_2,r_2)$. Given also the positions where they are inserted in the ΔT vector, $k_1=tr_1-tq_1$ and $k_2=tr_2-tq_2$. The difference between both positions is defined as $\beta=|k_1-k_2|$, which corresponds to the time distance between both points in the ΔT vector. We can find the warping range by finding the maximum allowed value of β given each of the imposed warping constraints.

Figure 4:
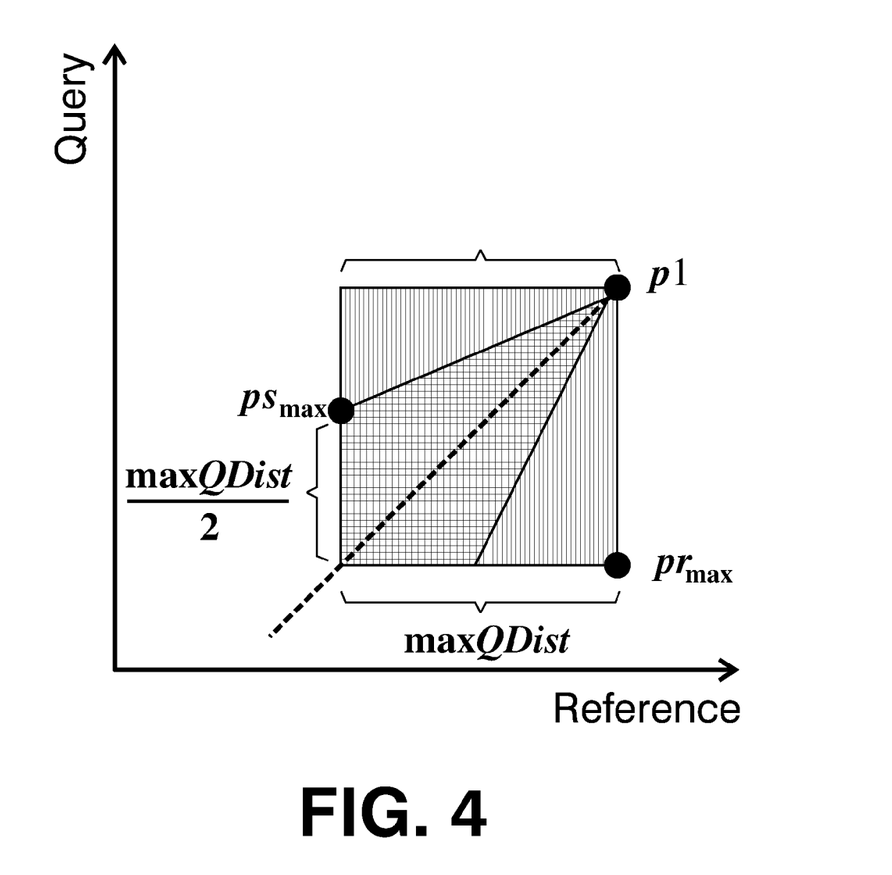
FIG. 4 shows graphically the warping constraints, applied to a matching point $p_1$.

For this purpose we show in FIG. 4 both constraints applied to matching point $p_1$. Given any point $p_2$ placed in FIG. 4 we can easily interpret β as the time distance, offset, (in either axis) from $p_2$ to the diagonal line that passes through $p_1$. While abiding to the imposed warping constraints, matching points $ps_{max}$ and $pr_{max}$ are those that obtain a maximum β value for the strict and relaxed warping constraints, respectively, and their value is the warping range we are seeking, as seen in equation 5. Note that due to the symmetrical properties of the considered constraints, there are multiple points with the same maximum β value in FIG. 4.

$$WRange_{strict} = \frac{maxQDist}{2} \qquad \text{Equation 5}$$

$$WRange_{relaxed} = maxQDist$$

This shows how the value of WRange is defined entirely by the input parameter maxQDist. This is important in order to define the scope around the central position k where to look for possible warping paths. Had maxQDist not been defined (e.g. any point would have been allowed to be included to any matching path, regardless of how far such path had been) we would have had to search for possible matching paths along all values of k', which would cause a big computational burden for the algorithm.

As it has been previously mentioned, one of the advantages of this algorithm is that it does not require to store in memory the similarity matrix between the two sequences being compared. Only the ΔT vector of matching paths should be stored, which is a sparse vector as it does not contain matches for every one of its positions. Still, for long time series the ΔT vector could still become a problem to be stored in memory and to be able to access each of its positions. A straightforward modification of this algorithm can be proposed to implement this vector as a circular buffer where k positions are located in the vector as l=k % L (that is, l will be the remainder from the division of k by L) where l is the resulting location in ΔT and L is the length of the circular buffer used. In each location in the new vector we now need to have a double-linked list of matching paths and need to transverse such list in search for the proper k every time we want to check for matching paths. Note though that the particularities of the data being stored in these lists (being initially a sparse vector, it is) makes it possible to apply many speedups that alleviates the increase in computation due to the creation of the circular vector. With the implementation of a limited and controlled ΔT vector we can use this algorithm to process vast quantities of data, therefore eliminating all constraints still existent in the size of the reference data that the algorithm is able to process.

As an example of how the circular vector implementation would work, let's consider two time series, Q and R, with lengths 10 and 190 respectively. In a standard computer implementation, instead of defining a location in ΔT as k=tr−tq, we would rather add a constant offset to it which ensures that all resulting positions are positive or zero, and therefore directly represent a position in a computer vector. The value of such offset is equal to the length of the query (i.e. the number of elements in contains), which in this example is 10, therefore we can define the location k as k=tr−tq+10. Without any circular implementation we would need to allocate space in memory for ΔT to hold matches ranging from k=0 (resulting from tq=10 and tr=0) and k=200 (resulting from tq=0 and tr=190), therefore a total of 200 memory locations. Instead, if we define a circular buffer with L=100 positions, we can still insert all matches in the ΔT vector by first computing the new location l=k %100. For example, a k=155 would be placed in l=55 together with matches for k=55. In order to manage multiple matching paths located in the same position in ΔT we added to the paths the information about the k value being inserted.

The proposed IR-DTW algorithm solves the main drawbacks of the prior art solutions. For example, as previously shown, the proposed method and system avoids therefore, the construction of a similarity matrix (neither sparse nor full), as it is a constraint for dealing with big datasets due its memory requirements. Instead, an information-retrieval inspired mechanism is used where the information of the partial paths is stored as they are accumulated. These partial paths are kept in memory until they are considered finished, when the matching paths are returned, and then deleted from memory. These paths can be accessed quite efficiently by using a circular vector structure, reducing the amount of memory pre-reserved by the system. And indexing structures can be used on one of the time series (which we will note as R, or reference sequence) to efficiently obtain the closest matching reference points for every point in the other time series (noted as Q, or query sequence). The proposed algorithm can process the data available in Q to find matching paths with R without representing it into a matrix form like it is done in most DTW implementations. Still, the algorithm remains independent of the particular indexing of the reference data being used, which can be done totally offline. Even though the proposed algorithm does not have the memory burdens of standard DTW implementations, it is still able to find non-linear alignments between time sequences like a standard DTW algorithms can.

The proposed algorithm can be performed by any kind of processing system (e.g. a c computer system) having enough processing capacity to perform the above-described method steps. The different steps of the method can be performed by a single processing entity or by different processing entities (e.g. computers) situated in the same location or distributed in different locations and communicating between them using any known communication resources.

The proposed solution is very efficient for matching time series in many different scenarios. For example, it is especially useful in the following use cases:

Alignment of Very Long Sequences: This first use case corresponds to the alignment of two time series from start to end (as the standard DTW does). The advantages of using the proposed algorithm become evident when the time series have a length that does not allow for the storage of all similarity and support matrices in memory, where DTW can not be used directly as their memory requirements are quadratic with the size of both time series. In the past, some algorithms have been proposed to solve this problem by iteratively aligning both time series by just keeping in memory two vectors of the size of one of the series. The main problem of these approaches is usually of computational complexity. By using the proposed algorithm, it is not incurred on any computational penalty (in fact, by applying similarity search of matching pairs, the search can be speeded up compared to a standard exhaustive search) and the memory requirements are greatly reduced compared to the required size in a DTW implementation. In order to use, in an embodiment, the proposed algorithm for this use, it is better to constraint the algorithm so that only one path is allowed to be generated between the start of both time series (tq=tr=0) and end at the end of both time series (tq=$tq_{max}$, tr=$tr_{max}$).

Segmental Search: This use case corresponds to the search of a smaller time series (usually called a query) within a bigger time series (which we will call the reference) (as the standard segmental-DTW algorithms do). This can be used to search for the possible existence of a well-defined query within a large reference time series. A typical practical example of this use case is spoken voice search. In order for the proposed algorithm to perform this use case, it is better to constraint the algorithm to allow matching paths to start only in the first element of the query and only allow paths to end in the last element of the query, regardless of which element of the reference we are at.

Subsequence Search: This use case corresponds to the unconstrained search for matching subsequences between both time series. Such subsequences are usually constrained to have a minimum length and a minimum overall similarity in order to consider them as matches. This use case usually appears when both time series are thought to contain more than one matching path at different locations. It is also useful to analyze the self similarity of a single time series where the resulting output is the list of co-occurrences of subsequences along the time series. A typical example in speech would be to find which words or acoustic queues appear the most in a speech recording. In order for the proposed algorithm to perform subsequence matching between two time series no alterations need to be made. Note that if the same time series is used to find the co-occurring subsequences, it is better to avoid the system from returning the obvious diagonal matches.

Online Subsequence Search: As an extension to the previous use cases, given that it is possible to index one of the time series (considered as reference) and search on it using the other time series sequentially (query), it is possible to build applications that perform an online search for matching sequences in the query as it becomes available. These results can provide immediate feedback for systems requiring a fast response where we are not able to wait for the system to capture all the input query and then process it to give a response. An example of such systems could be the intelligent rerouting of phone calls from customers providing a free form description of their needs.

Although the present invention has been described with reference to specific embodiments, it should be understood by those skilled in the art that the foregoing and various other changes, omissions and additions in the form and detail thereof may be made therein without departing from the scope of the invention as defined by the following claims.

The invention claimed is:

1. A computer-implemented method of determining matching subsequences between a first sequence of values and a second sequence of values, said method comprising:
inputting said first and second sequences of values into an alignment algorithm, said alignment algorithm defining a plane of points corresponding to said sequences of values,
said alignment algorithm identifying similar points on said plane according to a predefined similarity metric, and
said alignment algorithm grouping a plurality of said similar points between said two sequence values so as to define a path according to said alignment algorithm, and outputting a series of optimized matching subsequences according to predetermined path characteristic metrics, wherein said alignment algorithm uses a one-dimensional vector structure of paths, and said paths have a non-linear alignment between said matching subsequences,
where the first sequence of values is a first time series $Q=\{q_1; q_2; ; q_M\}$ and the second sequence of values is a second time series $R=\{r_1; r_2; \ldots; r_N\}$ of real valued n-dimensional vectors, where n is a design parameter, where said one-dimensional vector structure of paths is called $\Delta T$ and is set as void as start up and where said alignment algorithm includes the following steps;
a) For every vector, $q_i$, belonging to Q do:
b1) Select the vectors in R which are considered most similar to $q_i$ according to the predefined similarity metric
b2) For every vector $r_j$ belonging to the group selected in the previous step do:
b21) Set a variable k=$tr_j$–$tq_i$, where $tq_i$ and $tr_j$ are the offsets of vector $q_i$ and $r_j$ from the start of their respective sequences;
b22) Set a variable best_path=($q_i$, $r_j$);
b23) For k'=k−Wrange to k+WRange, where Wrange is a design parameter do:
b231) Set a variable p=$\Delta T$(k');
b232) Determine if the offset between vector pair ($q_i$, $r_j$) and p is less than a predefined first threshold, and if so, b233) Determine if the vector pair ($q_i$, $r_j$) meets a predefined set of warping constraints with respect to p and if so,
b234) Select the best path according to a first path characteristic metric, between the path composed by adding the vector pair ($q_i$, $r_j$) to p and the path stored in best_path and set the variable best_path as the path selected;
b235) Go to step b231) for the next value of k';
b24) $\Delta T(k)$=best_path;
b25) Go to step b21) for the next value of $r_j$;
b3) Go to step b2) for the next value of $q_i$.

2. A method according to claim 1 where the method further comprises a step c), comprising: for all the paths registered in $\Delta T$, calculate a second path characteristic metric and including in a set of optimal paths, only the paths whose second path characteristic metrics meet a predefined criteria.

3. A method according to claim 2, where the first and the second path characteristic metrics are selected from one of the following: the number of points in the path, the accumulated distance of the points in the path, average similarity of the points in the path, path length or a combination of these criteria.

4. A method according to claim 2, where the method further comprises a step d) comprising: when a path is selected to be included in the set of optimal paths, checking if there is any path already included in said set in strong overlap with the new one, and if so, merging the new path with the path found to obtain a merged path and instead of including the selected path, including the merged path in the set of optimal paths and deleting the path found in strong overlap with the new one from the set of optimal paths.

5. A method according to claim 1, where if the offset between vector pair ($q_i$, $r_j$) and p is not less than the predefined first threshold, the second path characteristic metric is calculated for path p and said path is included in the a set of optimal paths if its path characteristic metric met the predefined criteria.

6. A method according to claim 1 where the step of selecting the vectors in R which are considered most similar to $q_i$ according to the predefined similarity metric , comprises: calculate the predefined similarity metric between $q_i$ and each of the vectors of R and selects said vectors of R whose predefined similarity metric with $q_i$ is less than a predefined second threshold and where the predefined similarity metric is the Euclidean distance, the inner product or any other distance or similarity between vectors.

7. A method according to claim 1, where the step of selecting the vectors in R which are considered most similar to $q_i$ according to the predefined similarity metric is performed using an Information Retrieval based algorithm to allow fast retrieval of similar vectors, like for example the Locality Sensitive Hashing algorithm.

8. A method according to claim 1, where the step of determining if the offset between vector pair ($q_i$, $r_j$) and p is less than a predefined first threshold, called maxQDist, comprises: determining if $tr_j - p \cdot tr_{end} <$ maxQDist and $tq_i - q_{end} <$ maxQDist, where $p \cdot tq_{end}$ and $p \cdot tr_{end}$ are the offsets of points $q_{end}$ and $r_{end}$ from the start of their respective sequences and $r_{end}$, $q_{end}$ is the last matching point of the path p.

9. A method according to claim 1, where the step of determining if the vector pair ($q_i$, $r_j$) meets a predefined set of warping constraints with respect to p, comprises:
determining if $tr_j - p \cdot tr_{end} >= 0$ and $tq_i - tq_{end} >= 0$, where $p \cdot tq_{end}$ and $p \cdot tr_{end}$ are the offsets of points $q_{end}$ and $r_{end}$ from the start of their respective sequences and $r_{end}$, $q_{end}$ is the last matching point of the path p.

10. A method according to claim 1, where the step of determining if the vector pair ($q_i$,$r_j$) meets a predefined set of warping constraints with respect to p, comprises:
determining if $tq_i - tq_{end} >= (tr_j - p \cdot tr_{end})/2$ and $tq_i - q_{end} <= 2*(tr_j - p \cdot tr_{end})$, where $p \cdot tq_{end}$ and $p \cdot tr_{end}$ are the offsets of points $q_{end}$ and $r_{end}$ from the start of their respective sequences and $r_{end}$, $q_{end}$ is the last matching point of the path p.

11. A method according to claim 1, where the vector $\Delta T$ is implemented as a circular buffer of length L, where the path in position k will be stored in $\Delta T$ in location l, where l is the remainder from the division of k by L.

12. A method according to claim 1 where the offset is a time offset.

13. A system comprising means adapted to perform the method according to claim 1.

14. A computer program comprising computer program code stored on a non-transitory computer readable medium, adapted to perform the method according to claim 1, said program is run on a computer, a digital signal processor, a field-programmable gate array, an application-specific integrated circuit, a micro-processor, a micro-controller, or any other form of programmable hardware.

* * * * *